(12) United States Patent
Minowa

(10) Patent No.: US 7,188,154 B2
(45) Date of Patent: Mar. 6, 2007

(54) RECEIPT PRINTING AND ISSUING SYSTEM, AN ADDED-VALUE PRINTING PROCESSING METHOD AND A DATA STORAGE MEDIUM USING THE SAME

(75) Inventor: Masahiro Minowa, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 661 days.

(21) Appl. No.: 09/812,709

(22) Filed: Mar. 19, 2001

(65) Prior Publication Data

US 2001/0032266 A1 Oct. 18, 2001

(30) Foreign Application Priority Data

Mar. 27, 2000 (JP) .............................. 2000-087271

(51) Int. Cl.
*G06F 15/16* (2006.01)
*G07G 1/14* (2006.01)

(52) U.S. Cl. ....................................... 709/219; 705/14

(58) Field of Classification Search ................ 709/204, 709/219; 705/16, 14, 5, 18, 20, 21, 22, 26, 705/27, 28, 29

See application file for complete search history.

(56) References Cited

U.S. PATENT DOCUMENTS

| 4,554,446 A | * | 11/1985 | Murphy et al. | ............. | 235/487 |
| 4,671,512 A | * | 6/1987 | Bachman et al. | ............ | 273/139 |
| 4,833,308 A | * | 5/1989 | Humble | ....................... | 235/383 |
| 4,896,791 A | * | 1/1990 | Smith | ............................ | 221/7 |
| 4,993,714 A | * | 2/1991 | Golightly | ..................... | 463/17 |
| 5,197,001 A | * | 3/1993 | Mukherjee | .................... | 705/29 |
| 5,235,509 A | * | 8/1993 | Mueller et al. | ............... | 705/15 |
| 5,250,789 A | * | 10/1993 | Johnsen | ....................... | 705/14 |

(Continued)

FOREIGN PATENT DOCUMENTS

EP 1035527 9/2000

(Continued)

OTHER PUBLICATIONS

Manoj Kumar et al., Sales Promotions on the Internet, 3rd USENIX Workshop on Electronic Commerce, 1998.*

(Continued)

*Primary Examiner*—Jason Cardone
*Assistant Examiner*—Ajay M Bhatia
(74) *Attorney, Agent, or Firm*—Hogan & Hartson LLP

(57) ABSTRACT

In a terminal system having a printing function for printing additional information about special events, introductions, or advertising to sales receipts issued by a convenience store or kiosk when a purchase is made, or to queuing number tickets issued to customers waiting in a bank, customers can select information of personal interest from a list of advertising information so that the selected information is printed to the receipt or ticket issued by the system. A functional terminal of a POS system having an input device, printer, display, and controller for use in various applications comprises a display for presenting plural advertising information entries, a means for selecting desired entries from the displayed list, and a means for printing the selected information to a receipt issued by the terminal device. Information wanted by the customer can thus be selectively printed with the sales transaction information normally printed to the receipt that is handed to the customer.

20 Claims, 11 Drawing Sheets

U.S. PATENT DOCUMENTS

| | | | | |
|---|---|---|---|---|
| 5,459,306 A * | 10/1995 | Stein et al. | | 235/383 |
| 5,481,094 A * | 1/1996 | Suda | | 705/14 |
| 5,708,782 A * | 1/1998 | Larson et al. | | 705/14 |
| 5,832,457 A * | 11/1998 | O'Brien et al. | | 705/14 |
| 5,845,259 A * | 12/1998 | West et al. | | 705/14 |
| 5,857,175 A * | 1/1999 | Day et al. | | 705/14 |
| 5,905,246 A * | 5/1999 | Fajkowski | | 235/375 |
| 5,918,211 A * | 6/1999 | Sloane | | 705/16 |
| 5,924,078 A * | 7/1999 | Naftzger | | 705/16 |
| 5,978,772 A * | 11/1999 | Mold | | 705/16 |
| 6,041,268 A * | 3/2000 | Jin | | 705/29 |
| 6,047,262 A * | 4/2000 | Lutz | | 705/16 |
| 6,047,310 A | 4/2000 | Kamakura et al. | | |
| 6,076,068 A * | 6/2000 | DeLapa et al. | | 705/14 |
| 6,144,743 A * | 11/2000 | Yamada et al. | | 705/1 |
| 6,151,587 A * | 11/2000 | Matthias | | 705/14 |
| 6,223,163 B1 * | 4/2001 | Van Luchene | | 705/1 |
| 6,237,145 B1 * | 5/2001 | Narasimhan et al. | | 725/23 |
| 6,267,670 B1 * | 7/2001 | Walker et al. | | 463/17 |
| 6,311,165 B1 * | 10/2001 | Coutts et al. | | 705/21 |
| 6,334,108 B1 * | 12/2001 | Deaton et al. | | 705/14 |
| 6,343,739 B1 * | 2/2002 | Lippert | | 235/383 |
| 6,401,074 B1 * | 6/2002 | Sleeper | | 705/14 |
| 6,501,531 B1 * | 12/2002 | Clark et al. | | 355/40 |
| 6,529,881 B2 * | 3/2003 | Morganstein et al. | | 705/18 |
| 6,529,940 B1 * | 3/2003 | Humble | | 709/204 |
| 6,546,418 B2 * | 4/2003 | Schena et al. | | 709/219 |
| 6,611,810 B1 * | 8/2003 | Kolls | | 705/14 |
| 6,611,811 B1 * | 8/2003 | Deaton et al. | | 705/14 |
| 6,643,626 B1 * | 11/2003 | Perri de Resende | | 705/64 |
| 6,647,372 B1 * | 11/2003 | Brady et al. | | 705/14 |
| 6,650,429 B2 * | 11/2003 | Marshall et al. | | 358/1.14 |
| 6,892,183 B1 * | 5/2005 | Cooper et al. | | 705/16 |
| 6,932,270 B1 * | 8/2005 | Fajkowski | | 235/383 |
| 2001/0032266 A1 * | 10/2001 | Minowa | | 709/229 |
| 2002/0026348 A1 * | 2/2002 | Fowler et al. | | 705/10 |
| 2002/0077889 A1 * | 6/2002 | Kolls | | 705/14 |
| 2002/0165769 A1 * | 11/2002 | Ogaki et al. | | 705/14 |
| 2003/0036979 A1 * | 2/2003 | Tokorotani | | 705/27 |
| 2003/0061100 A1 * | 3/2003 | Minowa | | 705/14 |
| 2003/0074261 A1 * | 4/2003 | Norris | | 705/17 |
| 2003/0208560 A1 * | 11/2003 | Inoue et al. | | 709/219 |
| 2004/0039661 A1 * | 2/2004 | Fuzell-Casey et al. | | 705/27 |
| 2004/0041022 A1 * | 3/2004 | Minowa et al. | | 235/383 |
| 2005/0096988 A1 * | 5/2005 | Yanagisawa et al. | | 705/16 |

FOREIGN PATENT DOCUMENTS

| | | | |
|---|---|---|---|
| EP | 1035527 A2 * | 9/2000 | |
| EP | 1035527 A3 * | 8/2001 | |
| EP | 1139316 A2 * | 10/2001 | |
| EP | 1139316 A3 * | 8/2002 | |
| JP | 07-029072 | 1/1995 | |
| JP | 08-315252 | 11/1996 | |
| JP | 09-081863 | 3/1997 | |
| JP | 9-91358 | 4/1997 | |
| JP | 09-161153 | 6/1997 | |
| JP | 10-063593 | 3/1998 | |
| JP | 10-091868 | 4/1998 | |
| JP | 11-066432 | 3/1999 | |
| JP | 11-134353 | 5/1999 | |
| JP | 11-144146 | 5/1999 | |
| JP | 11-232552 | 8/1999 | |
| JP | 11-328538 | 11/1999 | |
| JP | 11-514462 | 12/1999 | |
| JP | 2000-137754 | 5/2000 | |
| JP | 2000-322654 | 11/2000 | |
| KR | 1998-087570 | 12/1998 | |
| WO | 93/16443 | 8/1993 | |
| WO | WO 96/27843 | 9/1996 | |

OTHER PUBLICATIONS

P. Chandon et al., A Benefit Congruency Framework of Sales Promotion Effectiveness, ISEAD, Mar. 2000.*

Greg Shaffer et al., Competitive Coupon Targeting, Marketin Science, vol. 14m No. 4, 1995, pp. 395-416.*

OS/2; where to?, InformationWeek, n515, p. 13, Feb. 20, 1995.*

* 2000-322654 cross-reference to EP 1035527.

* cited by examiner (a)

(b)

RECEIPT PRINTING AND ISSUING SYSTEM, AN ADDED-VALUE PRINTING PROCESSING METHOD AND A DATA STORAGE MEDIUM USING THE SAME

BACKGROUND OF THE INVENTION

1. Field of the Invention

The present invention relates to a receipt printing and issuing system, and a printing method for the same, and relates more particularly to a receipt printing and issuing system and method for printing information of added value (also referred to below as "advertising information" or "additional information") such as an advertisement, coupon, introduction or event advertisement, to a receipt or queuing number ticket such as issued by a queuing number printer used in banks, securities companies, and hospitals to issue numbers for serving customers in order, or POS system or sales register printers for issuing receipts.

2. Description of Related Art

POS systems that can print specific information input from a data entry terminal, for example, located in the store in addition to sales receipt information printed on the sales receipt issued by the POS system have been proposed for use primarily in convenience stores and other retail establishments. Such systems can directly provide individual local residents with advertisements and information about local events, such as community chess tournaments or karaoke singing contests. As lifestyles change, such systems can be an extremely effective advertising medium for events in the near future. One of the basic functions essential to any system for printing such added-value information for handing directly to customers is a function for issuing printed matter to a customer.

The additional information is printed by such systems in addition to the information conventionally printed by the system, and is typically printed without white space therebetween. The advertising, public announcement, or other information thus additionally printed by the system is referred to herein as "additional information" or "advertising information." In addition, a POS system or other system having a function for printing such additional information is referred to herein as a "receipt printing and issuing system."

In a conventional POS system capable of printing advertising information to a customer receipt automatically extracts the print data based on customer information input by the convenience store operator (clerk, for example), and then prints the receipt. Whether the advertising information printed on the receipt is of any particular interest to the customer receiving the receipt is therefore unknown.

If the information printed on the receipt is of real interest to the customer receiving the receipt, the customer can be expected to read the information with care, making the advertisement extremely effective. Such media can be a powerful advertising medium depending on how it is used because such media are handed one at a time to a single customer.

Furthermore, any system that generates a receipt or other printed medium for a specific purpose is a potential advertising medium as used herein. Such systems can be integrally linked and operated as an advertising medium, and the value of such an advertising medium is potentially very powerful.

For example, queuing number printers (printers that print numbers for customers waiting in line at a bank or hospital, for example), ATMs, and even parking lot ticket printers offer potential advertising media. Potential advertising media such as these are already commonly used and there is widespread interest in using such media for advertising purposes.

Each of these potential advertising media is passed individually to a single customer, and the success of the system as an advertising medium therefore depends on how successfully information of interest can be provided to a particular customer.

An object of the present invention is therefore to provide a receipt printing and issuing system, advertising method, and data storage medium capable of providing advertising information of the greatest possible interest to the customer to whom the printed medium is provided.

A further object of the present invention is to provide a receipt printing and issuing system and advertising method that can be deployed in any system that generates a printed medium, and is therefore applicable but not limited to a POS system.

SUMMARY OF THE INVENTION

To achieve the above objects, a receipt printing and issuing system according to a first aspect of the present invention has an input device, printing device, display device, and storage device for printing other information in addition to required print information; comprises (a) a memory control means for receiving and storing advertising or other additional information, and reading said stored additional information as requested, (b) a display control means for displaying from the stored additional information a list of additional information satisfying a particular condition, (c) a selection control means for receiving input selecting additional information from the displayed list, and reading the additional information specified by said input, and (d) a print data generating means for generating and sending to the printing device as print data the additional information read by the selection control means; and thus prints other information in addition to the information that must normally be printed. With this aspect of the invention customers can select additional information that the customer wants, thus enabling effective advertising.

In a receipt printing and issuing system according to a second aspect of the invention the memory control means is a control means for receiving and storing additional information input over a network. This makes it possible to rapidly update the additional information.

In a receipt printing and issuing system according to a third aspect of the invention the selection control means is a means for selecting at least one item of additional information. It is therefore possible to provide at the same time plural additional information entries of interest to a single customer, and advertisements can therefore be presented more frequently.

In a receipt printing and issuing system according to a fourth aspect of the invention the selection control means is a means having a function for automatically reading specific additional information according to a specific rule when a specific time has elapsed. A drop in system output as a result of waiting for a selection can thus be appropriately prevented.

In a receipt printing and issuing system according to a fifth aspect of the invention the display control means is a means further comprising a function for selectively changing the specific condition for generating a list of additional information presented on the display device. In this case the operator at a convenience store, for example, enters customer data so that the customer data can be used to display a list of additional information thought to be most appropriate to the customer. The hit ratio of advertisements matching customer interests can thus be improved.

In a receipt printing and issuing system according to a sixth aspect of the invention the print data generating means further comprises a function for generating print data reducing plural items of additional information read by the selection control means to a specific ratio when plural items of additional information are selected. More additional information can thus be printed and customer wants can be better addressed. Advertisements can thus be presented without losing advertising opportunities. The required printing area can also be reduced.

In a receipt printing and issuing system according to a seventh aspect of the invention the receipt printing and issuing system is a purchase transaction processing system further comprising (e) an accounting information control means for registering a product purchase by a customer and outputting accounting information. The print data generating means generates print data combining accounting information output by the accounting information control means with the additional information read by the selection control means for printing as a receipt, and sends the print data to the printing device. This aspect of the invention is clearly applicable to a sales accounting system. While a POS system is typical of such a sales accounting system, the invention shall not be limited to use in POS systems and can be used in other transaction systems, such as used in a hospital or pharmacy.

In a receipt printing and issuing system according to an eighth aspect of the invention the receipt printing and issuing system is a customer ticket issuing system further comprising (f) a queuing number control means for managing queuing numbers and outputting a queuing number as print data. The print data generating means generates and sends to the printing device print data combining print data output by the queuing number control means with the additional information read by the selection control means.

This aspect of the invention is clearly applicable to a ticket issuing system. It will also be obvious that the present invention can be used in other applications, including such systems as ATM systems, parking ticket vending systems, and any other type of system that issues printed matter.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

Figure 1:
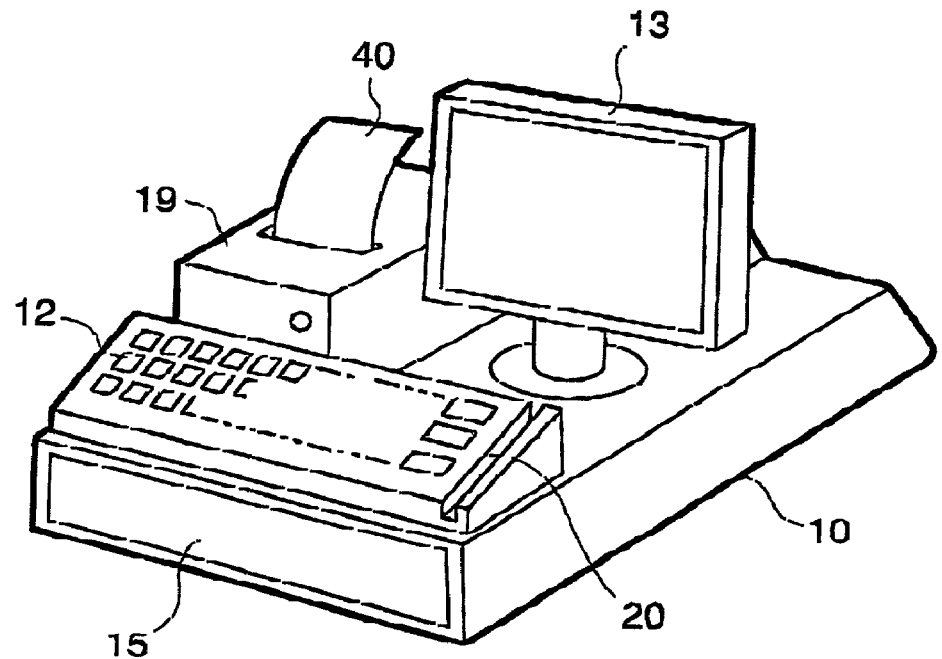
FIG. 1(a) is a front oblique view of a register for a POS system (POS terminal) using the present invention.
FIG. 1(b) is a back oblique view of the POS terminal.
Figure 1:
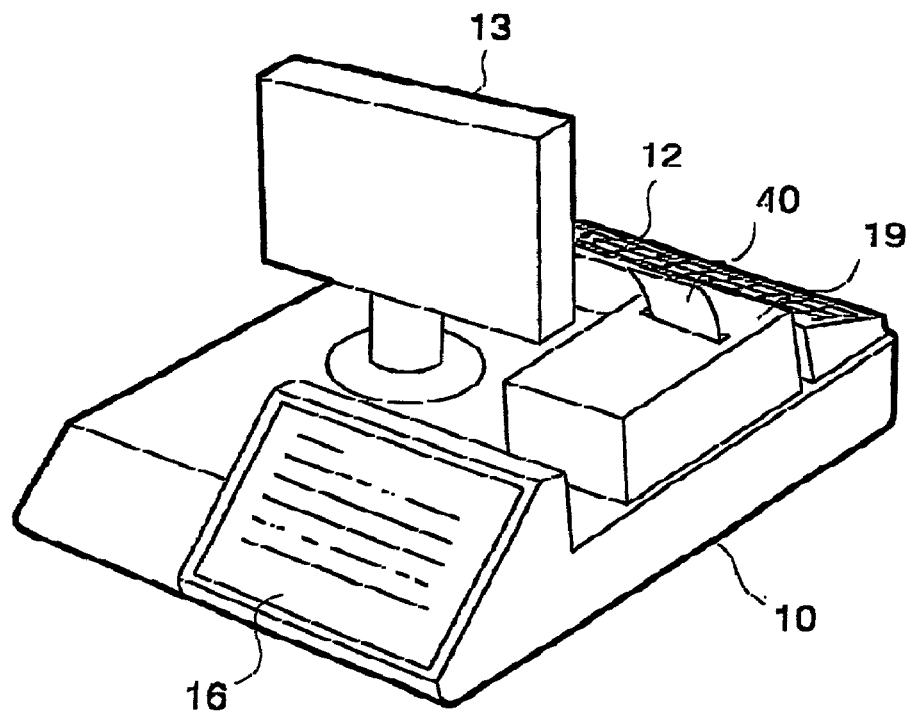

FIG. 1(a) is an oblique view from the front of a cash register for a POS system (referred to below as POS terminal 10) used in the present invention. Referring to FIG. 1, the POS terminal operator enters product information and customer information using the operator keyboard 12. Also shown in FIG. 1 are the operator display 13, cash drawer 15, and printer 19. A receipt 40 is issued by means of printer 19 after a transaction process is completed. Advertising information such as described above can be printed on the receipt 40. A card reader 20 is used for reading a credit card or other type of magnetic strip card.

FIG. 1(b) is an oblique view from the back of the POS terminal 10 shown in FIG. 1(a). Shown in FIG. 1(b) is an information selector 16 as used in the present invention. In this exemplary embodiment the information selector 16 is a display with a touch screen. The information selector 16 has a display 17 and selection input unit 18 (see FIG. 8). A list of advertising information that can be selected according to the customer is presented on the display 17. The customer can select information (further described in detail below) using the selection input unit 18, which is the touch screen in this exemplary embodiment. The advertising information selected by the customer using the information selector 16 is then printed on the receipt 40.

Figure 2:
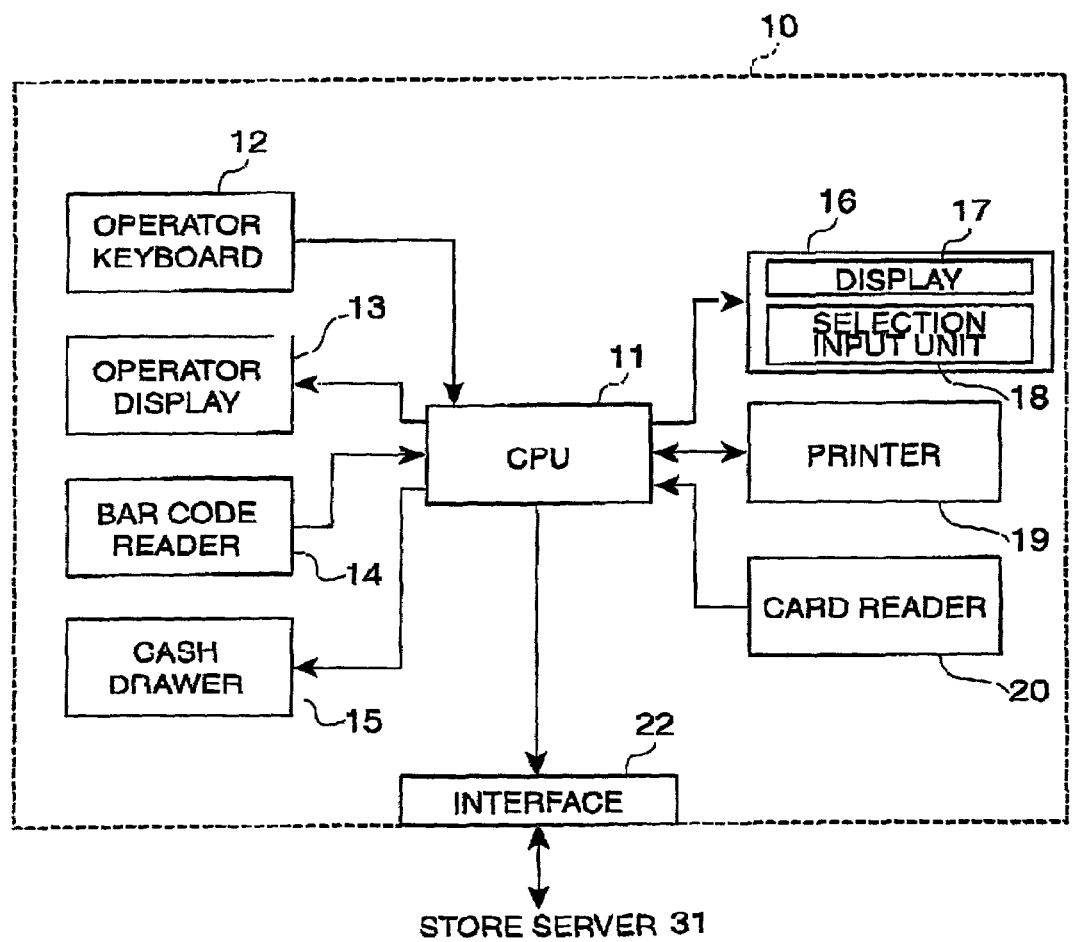
FIG. 2 is a block diagram showing the POS terminal in FIG. 1 in greater detail.

FIG. 2 is a block diagram showing the configuration of the POS terminal 10 in FIG. 1 in greater detail. While not shown in FIG. 2, it will be obvious that POS terminal CPU 11 also contains ROM, RAM, or other memory, and a storage device such as a hard disk. Connected to the POS terminal CPU 11 are operator keyboard 12, operator display 13, bar code reader 14, cash drawer 15, information selector 16, printer 19, and card reader 20. The POS terminal CPU 11 controls the various components of the POS system according to the operating system and other software stored to the internal memory. The CPU 11 is also connected to server 31 by way of interface 22.

Figure 3:
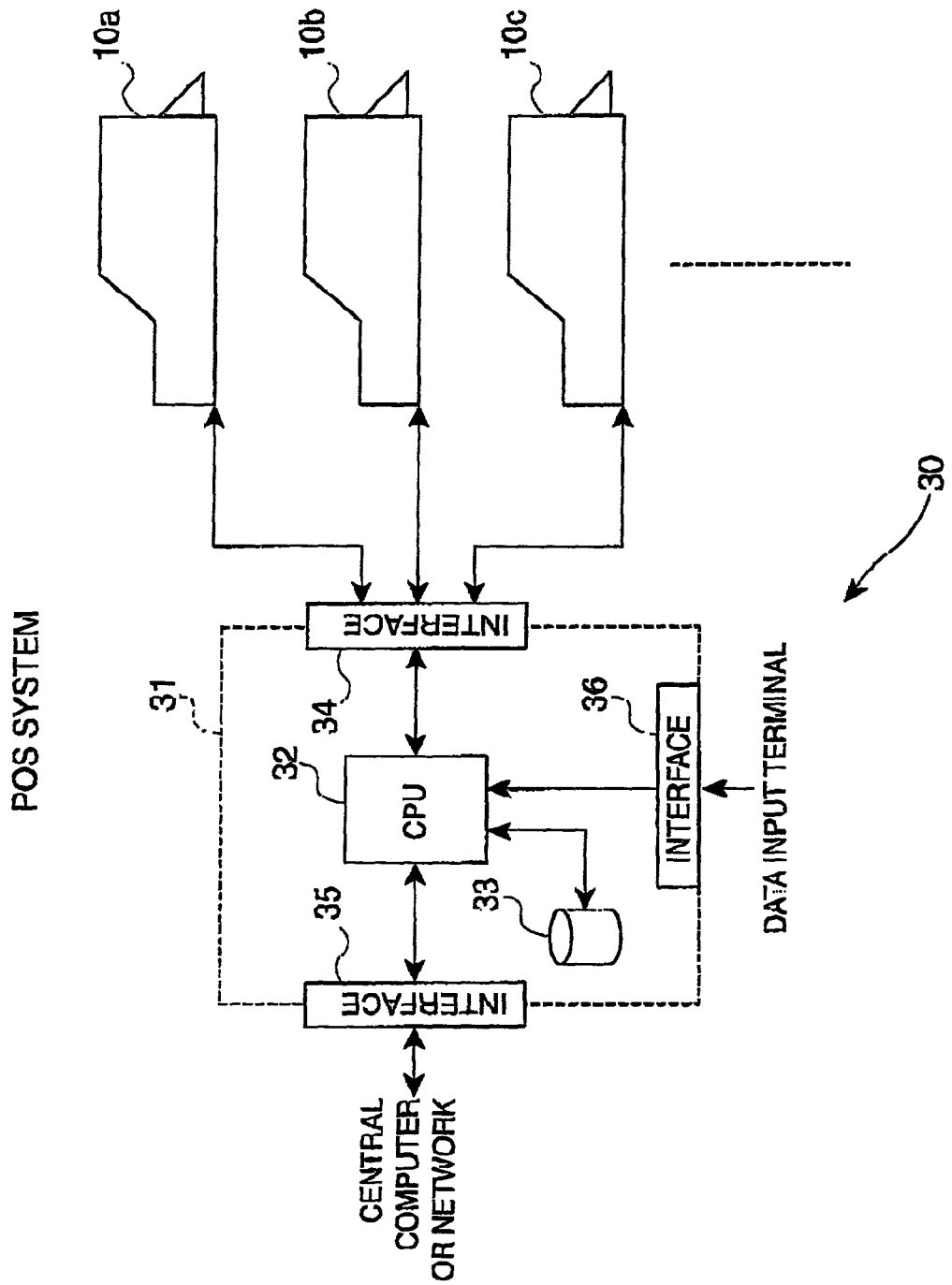
FIG. 3 shows a POS system comprising a store server and plural POS terminals connected thereto.

FIG. 3 shows a POS system 30 comprising a store server 31 and a plurality of POS terminals 10a to 10c (referred to as POS terminal 10 below) connected to the server 31.

The CPU 32 of server 31 comprises ROM, RAM, disk storage, or other type of memory (not shown in the figure) similarly to the CPU 11 of the POS terminal 10. Storage device 33, which is typically a hard disk or other relatively high capacity random-access storage device, is connected to and controlled by the server CPU 32.

Server CPU 32 is connected to POS terminal 10 by way of POS terminal interface 34, and is connected on the opposite side by way of server-side interface 35 to a central computer or network server (not shown in the figure). Updated product data and advertising information for printing to the receipt is sent to store server 31 from the central computer or network server by way of server-side interface 35.

CPU 32 is connected to a data input terminal by way of interface 36. Note that the data input terminal is not shown in the figures as it is not an essential element of the present invention. The data input terminal receives requests for advertising information to be printed to the receipt 40, and sends advertising information and other types of advertising data to the store server 31 by way of interface 36.

Figure 4:
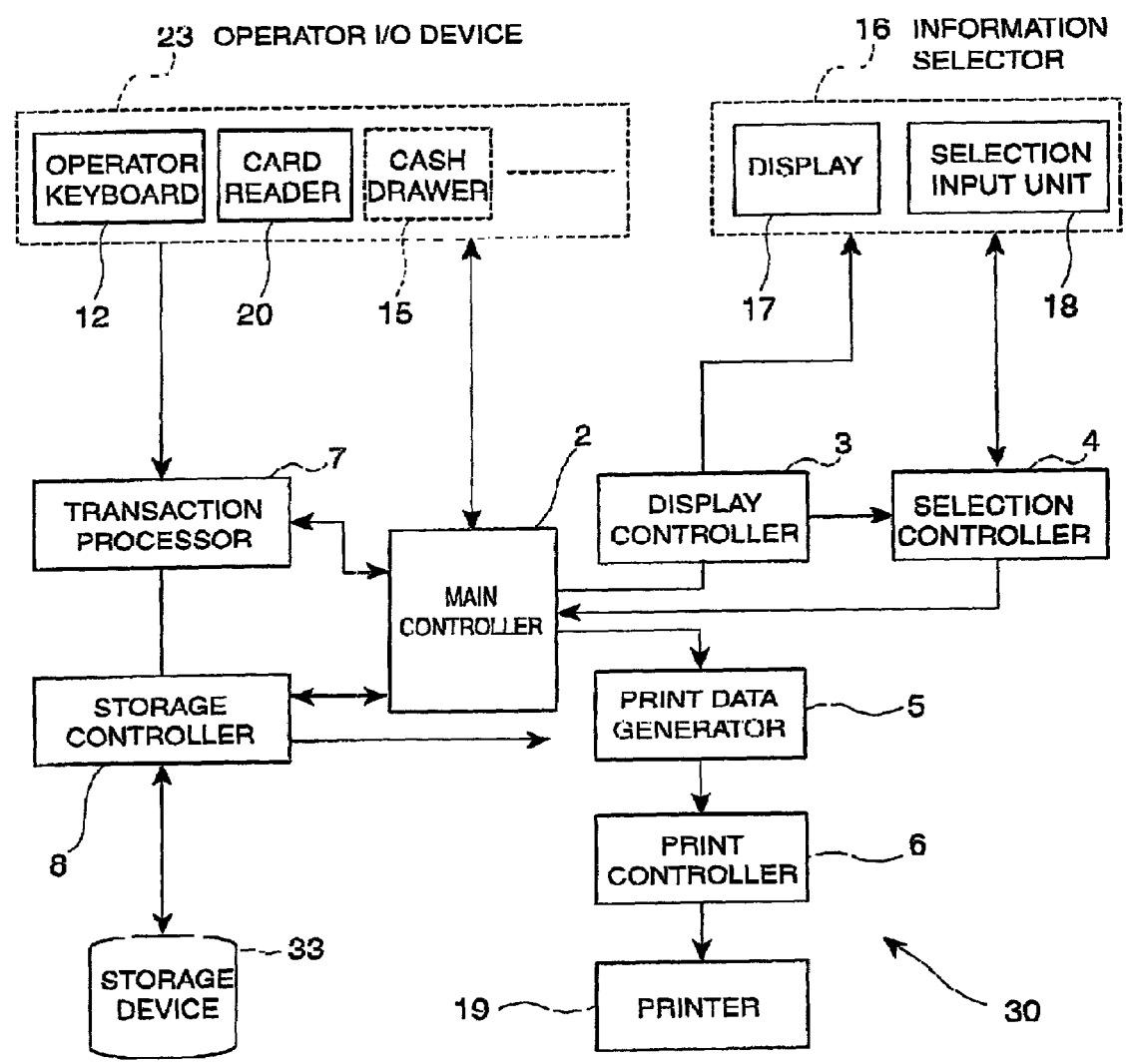
FIG. 4 is a function block diagram showing the basic functions of a POS system according to a first preferred embodiment of the present invention.

FIG. 4 is a block diagram showing the basic functions of a POS system 30 according to a preferred embodiment of the present invention. The functions of control means 2 to 8 in FIG. 4 are achieved by integrally connecting the POS terminal 10 and server 31, that is, by the interaction of the software, including the OS, stored to internal memory and CPUs 11 and 32 in FIG. 2 and FIG. 3.

The POS system 30 comprises a main controller 2 for controlling overall operation of the POS system 30. Various controllers, including a display controller 3, selection controller 4, print data generator 5, print controller 6, transaction processor 7, and storage controller 8, and operator I/O device 23, are connected to the main controller 2. An information selector 16 is connected to display controller 3 and selection controller 4.

When a customer comes to the operator with product to purchase, the operator first uses the operator keyboard 12 to enter specific customer data, such as the customer's age range and sex. The main controller 2 then sends this customer data to the storage controller 8. Based on this customer data, the storage controller 8 searches the advertising information in the storage device 33, and generates an advertising information list (selection list) appropriate to the customer.

The selection list is sent to main controller 2, and from there to the display controller 3. The display controller 3 then presents the selection list on the display 17 of information selector 16. The display controller 3 also notifies the selection controller 4 when the selection list has been displayed. Selection controller 4 enables the selection input unit 18 when this notice is received from the display controller 3. The customer is thus able to select the desired advertising information (additional information) from the selection list. When the customer selects the desired additional information from the selection input unit 18, the selection is output to selection controller 4.

The selection controller 4 notifies the main controller 2 if a selection has been received from the selection input unit 18 of information selector 16. The main controller 2 then reads the selected advertising information from storage device 32 by way of storage controller 8, and sends the information to the print data generator 5. The print data generator 5 combines the advertising information with the transaction data from a transaction process so that a receipt 40 can be printed and issued from the printer 19 under the control of print controller 6.

The transaction processor 7 is a function characteristic of a POS system or other sales transaction processing terminal, and typically sequentially registers the sale of each product. To register a product transaction, a bar code label applied to each product is typically scanned or otherwise entered; the product price is then fetched from storage device 33, and the name, price, and quantity of the product are stored; and the purchased quantity is subtracted from the inventory data.

Figure 5:
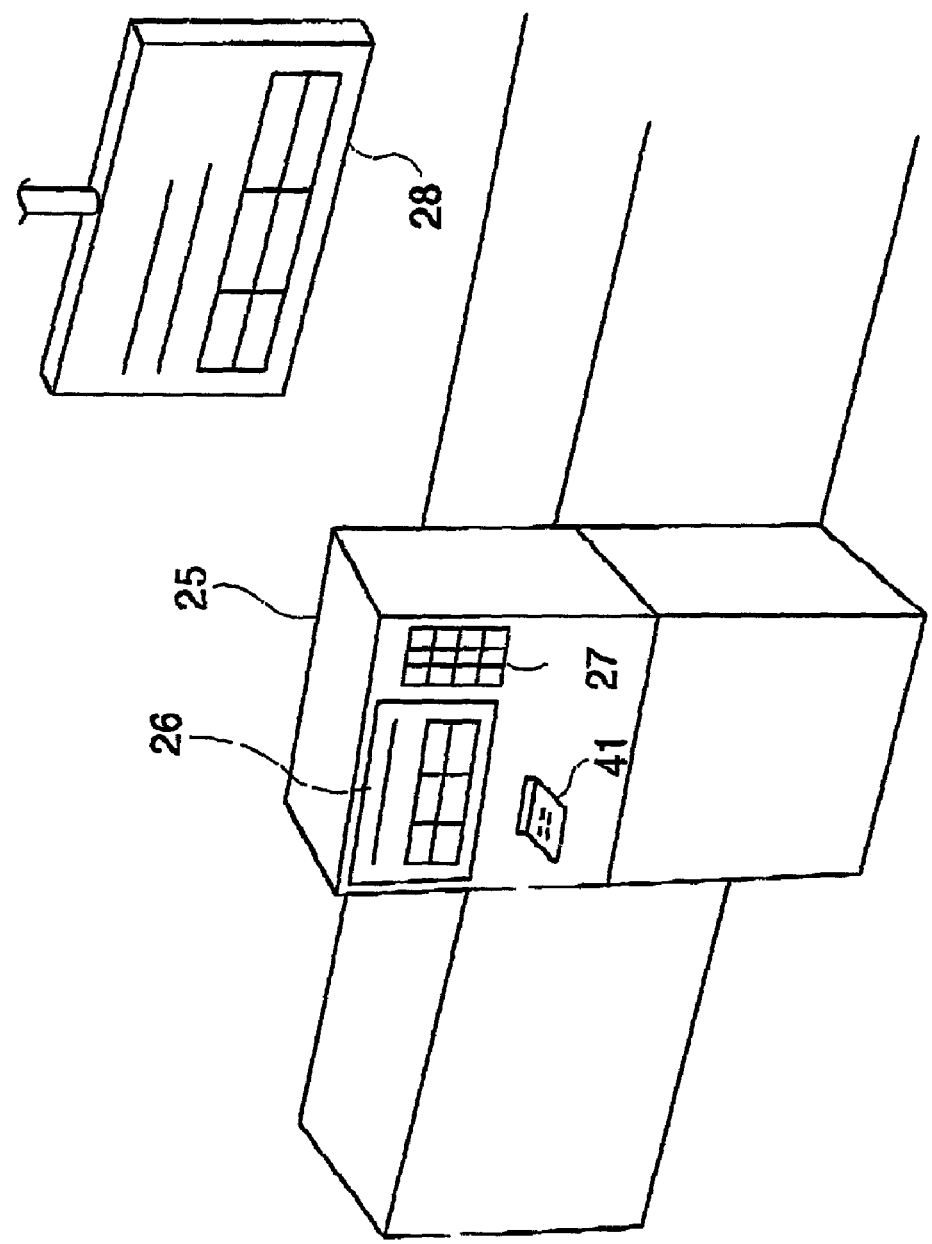
FIG. 5 shows a queuing number issuing device in which the present invention is used.

A queuing number printer 25 using the present invention is shown in FIG. 5. This type of queuing number printer 25 is typically used in banks, securities companies, hospitals, meat shops, delicatessens, and similar establishments serving customers in order on a first-come-first-serve basis. Like the POS system, this queuing number printer 25 is also connected to a server (not shown in the figure). A selection list of advertising information is shown on display 26, and a desired selection can be entered using the input unit 27.

A touch screen is also provided on display 26, making it possible to reduce the space needed for the queuing number printer 25. Queuing number ticket 41 is a numbered ticket issued by the queuing number printer 25. It should be noted that customer information is not entered with this queuing number printer 25, which is therefore preferably comprised to automatically display a particular selection list.

The displayed content of the selection list can be randomly selected. The displayed content could also be generated by analyzing the typical customers at particular times of the day based on statistical data so that the list content varies according to the likely customers at a given time. An employee or other operator could also analyze the customers present at a particular time of day, and appropriately change the selection list content according to the customers.

A large-scale display 28 can be mounted on the wall or ceiling of a waiting room, for example, for displaying the selection list and other information. People waiting in a waiting room are a captive audience with available time, and are likely to print information even if only slightly interesting. The desired information can be output on the queuing number printer 25 when a particular button is pressed, for example, or a completely separate output device could be used.

Figure 6:
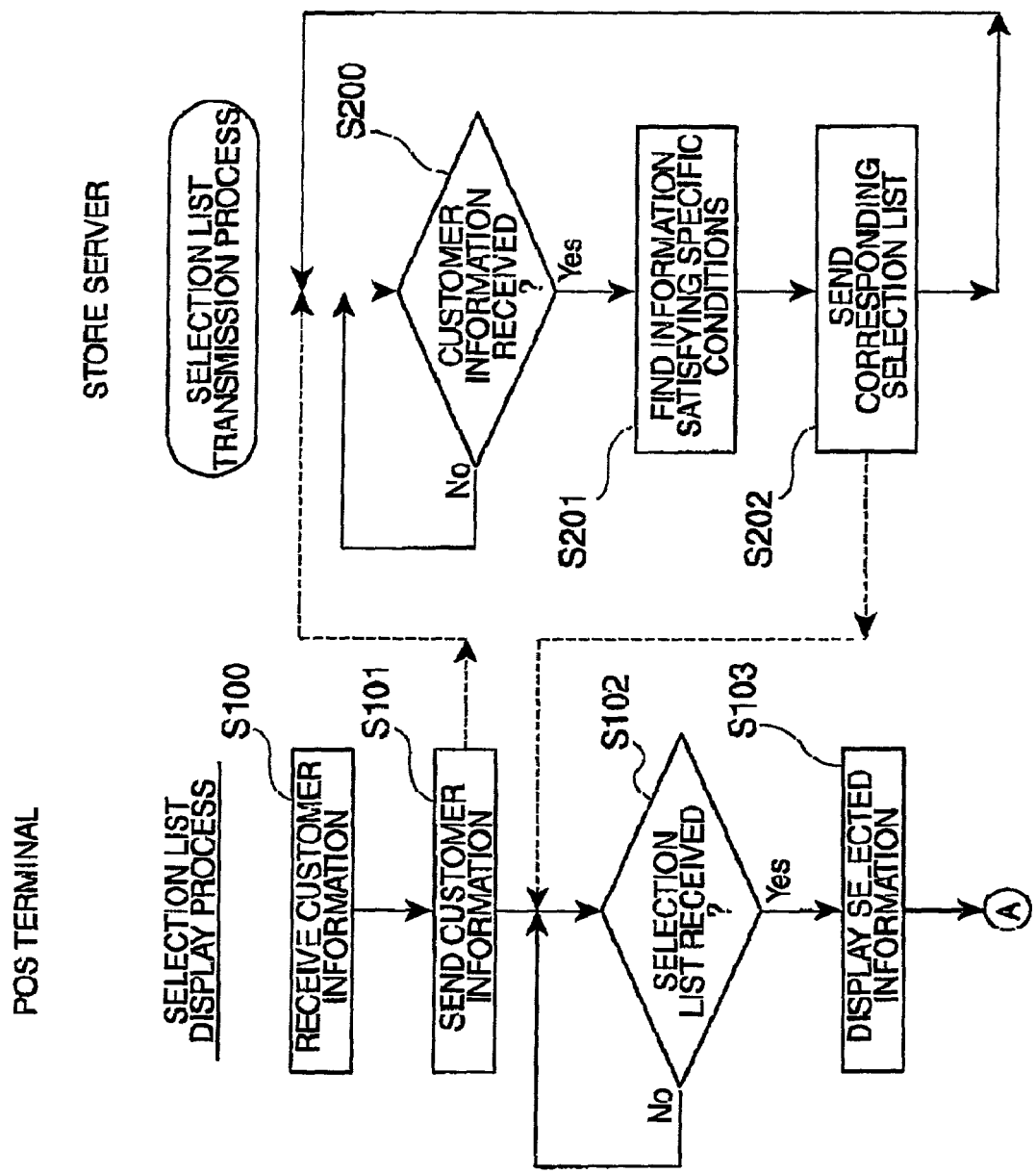
FIG. 6 is a flow chart of a process for displaying an additional information selection list and selecting an item in a POS system according to the present invention.

A process for displaying the selection list and enabling a selection to be input in a POS system 30 according to the present invention is described next with reference to FIG. 6.

When a customer brings a product to the POS terminal 10 to make a purchase (transaction), the operator (clerk) first enters the age range, sex, or other customer information from the keyboard 12, and the CPU 11 of POS terminal 10 waits for this data input (S100). When the CPU 11 receives the customer information, it sends the information to server 31 by way of interface 22 (S101). When the server 31 receives the customer information by way of interface 34 (S200 returns yes), it searches the storage device 33 for advertising information (selection list) having advertising conditions matching the customer information (S201).

When the search is completed, a list of selectable additional information extracted by the search is sent via interface 34 to the POS terminal 10 (S202). The POS terminal 10 receiving the selection list from server 31 (S102 returns yes) presents the selection list on information selector 16 and enables the user to select an entry (S103). When the selection list display process ends at this point, control proceeds from S110 in process A shown in FIG. 7.

Figure 9:
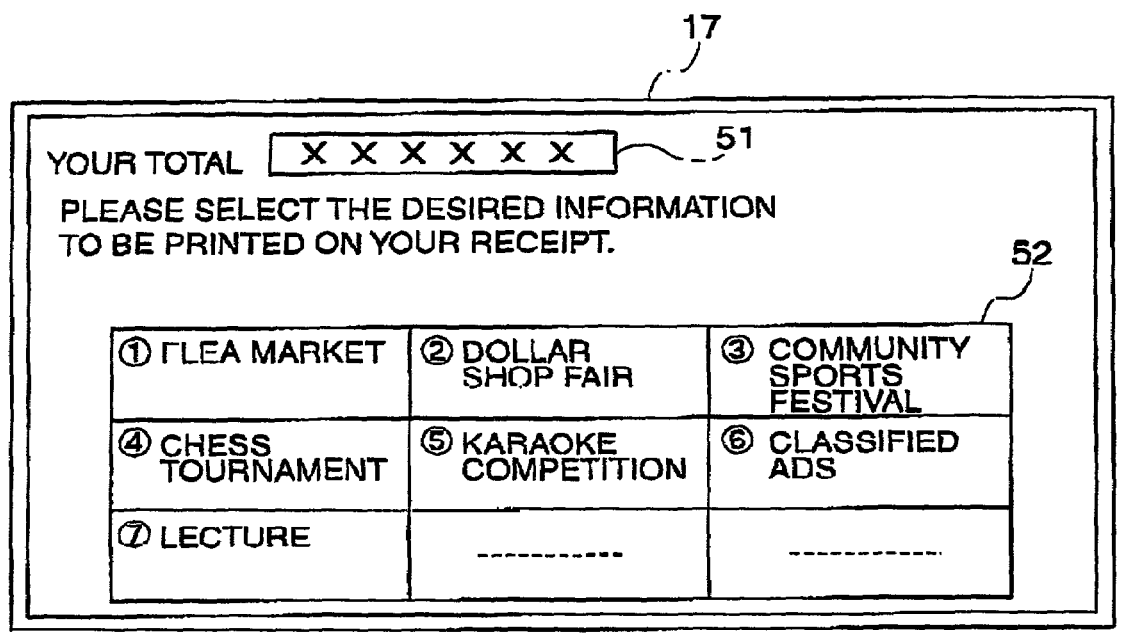
FIG. 9 shows an exemplary display of an advertising information list (selection list) presented on an information selection device.

An exemplary advertising information list (selection list) display presented on information selector 16 is shown in FIG. 9. A transaction amount line 51 is displayed on the top line of the screen on display 17 of information selector 16. This transaction amount is the transaction total accumulated each time a purchase transaction is registered. The advertising information list is shown by reference numeral 52 in FIG. 9. Selections 1 to 7 are available in this example. The customer can select one or a plurality of the desired items. Various selection entry means could be used. In this exemplary embodiment, however, the screen part of the advertising information list 52 is a touch screen so that when list entries are assembled in a matrix such as shown in FIG. 9, the customer can simply touch the desired item to make a selection. As a result of the above-described process only advertising information appropriate to the receipt-receiving party (that is, the customer) is presented in the selection list, thereby making it possible to provide advertising information that is appropriate to the customer.

A transaction process is described next with reference to FIG. 7. A transaction process is only appropriate in a POS system or other device used for handling monetary transactions.

When the operator enters product identification and quantity information using a bar code reader 14 and operator keyboard 12, for example, to start the transaction, this information is input to the CPU 11 (S110), and sent thereby to the server 31 by way of interface 22 (S111).

When the server 31 receives the product identification information via interface 34 (S210 returns yes), it finds the product price in the product database stored to storage device 33 (step S211), and sends this price information via interface 34 to the POS terminal 10 (S212). The server 31 then runs the transaction process for the purchased product (S213), and waits for the next product transaction process (S210).

POS terminal 10 receives the product price information through interface 22 (S112), and displays the price information on operator display 13, display 17 of information selector 16, and a customer display unit (not shown in the figure) (S113).

It is then determined whether entering product identification information has been completed (S114). Entering the product identification information has been completed if, for example, the operator presses a total key on the keyboard. If data entry is not over (step S114 returns no), the procedure loops back to step S110. If data entry is over (step S114 returns yes), control continues from the printing process shown in FIG. 8 and indicated as routine (B) in FIG. 7.

Figure 8:
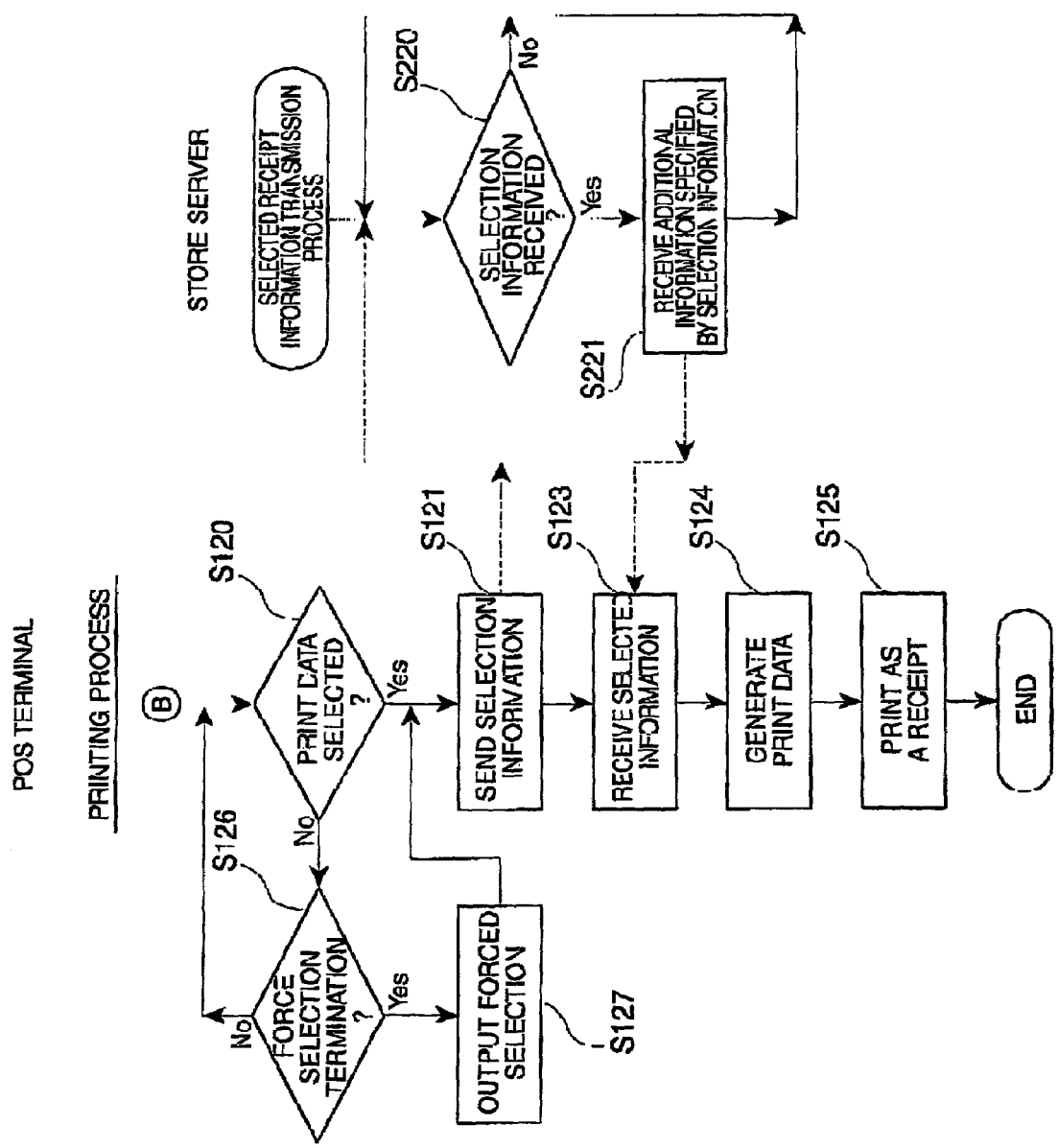
FIG. 8 is a flow chart of a printing process for combining receipt (purchase) information and additional information, and printing the combined information to a receipt.

A printing process is described next with reference to FIG. 8. FIG. 8 is a flow chart of a printing process for combining the transaction data with the advertising information, and then printing receipt 40.

Figure 7:
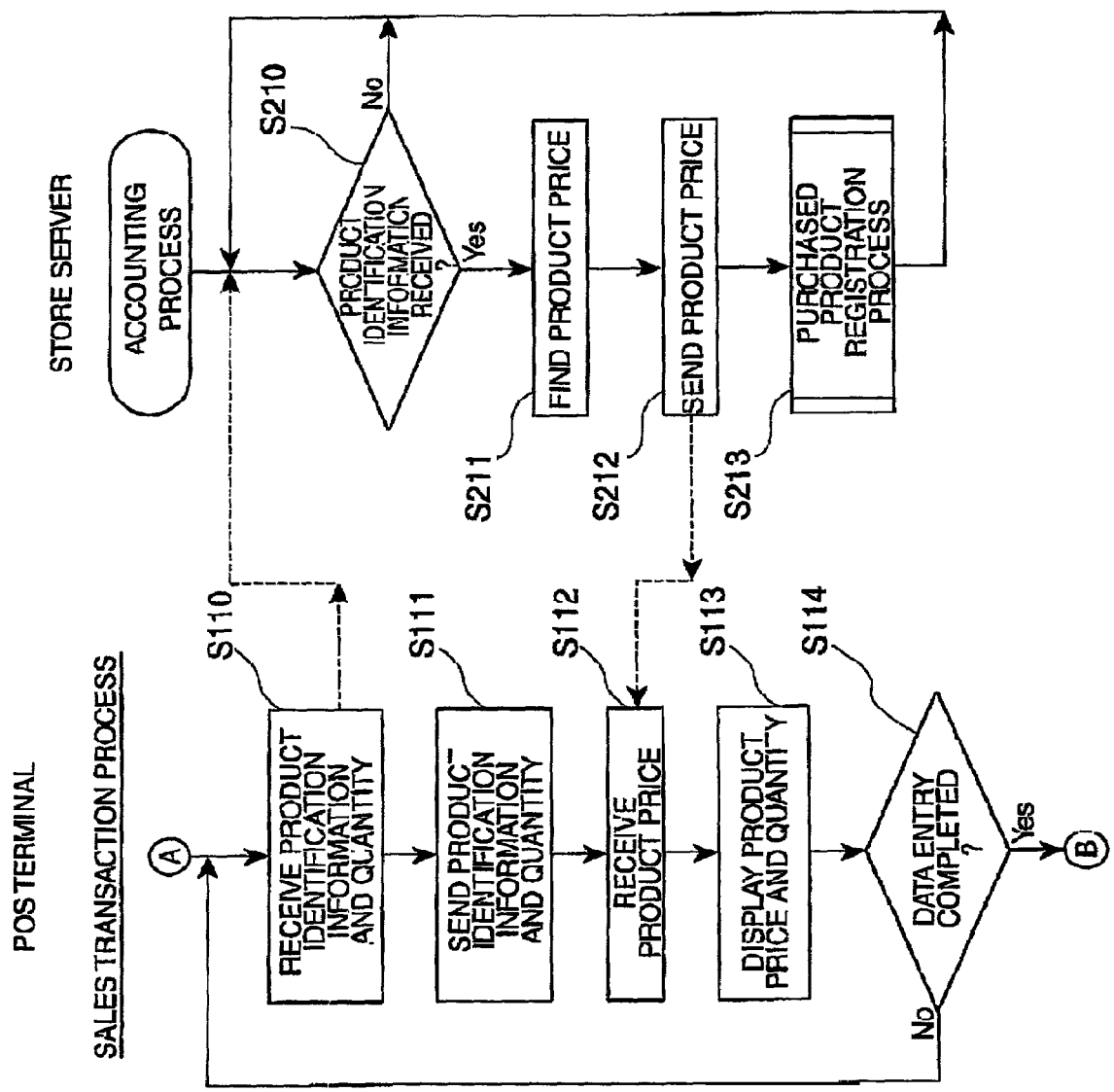
FIG. 7 is a flow chart of a financial transaction process.

When the product registration process shown in FIG. 7 ends, CPU 11 determines whether output information has been selected from the selection input unit 18 of information selector 16 (S120). If desired output information has already been selected (S120 returns yes), the selection information is sent through interface 22 to server 31 (S121).

If desired output information has not been selected (S120 returns no), whether to force termination of selection input is determined. If termination is not forced (S126 returns no), the procedure again waits for the selection to be entered (S120). If selection input is to be forcibly terminated (S126 returns yes) because the selection input standby time has exceeded a predetermined limit, for example, a display list selection is forced and the list is output (S127).

When the server 31 receives the selection information through interface 34 (S220 returns yes), the selected information is read from storage device 33, and the specific desired output information (advertising information) is sent to POS terminal 10 through interface 34. CPU 11 of POS terminal 10 then receives the advertising information through interface 22 (S123).

The POS terminal 10 then combines the advertising information received in step S123 and the transaction information generated in steps S110 to S113 in FIG. 7 to generate the advertising information (S124), prints receipt 40 by means of printer 19 (S125), and the printing process then ends. Various methods of combining the information are possible, including setting aside a printing area on the receipt 40 for the additional information and printing the additional information in this area, or first printing the additional information and then printing the transaction information.

Print samples of the receipt 40 or queuing number ticket 41 are shown in FIG. 10 to FIG. 14.

Figure 10:
FIG. 10 shows an exemplary receipt having advertising information printed below the transaction data.
Figure 11:
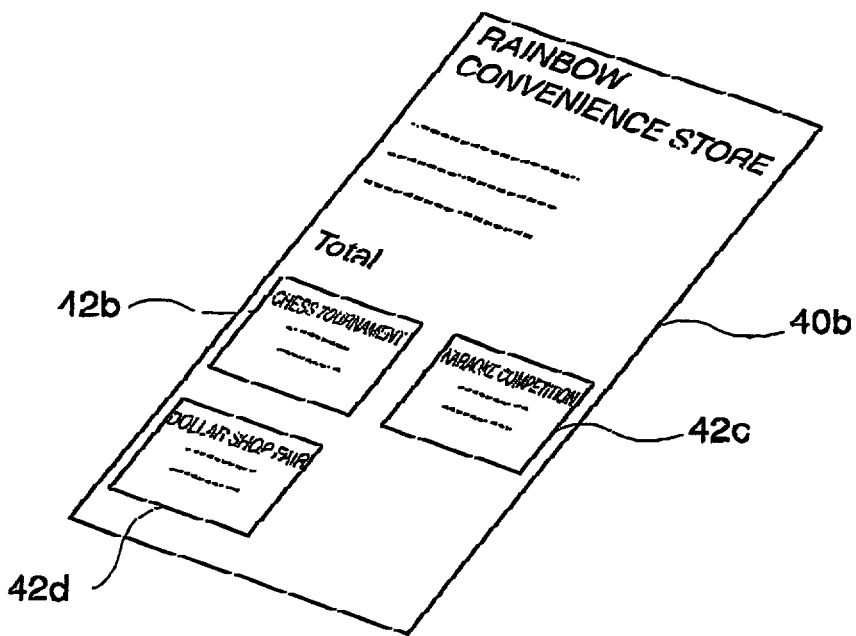
FIG. 11 shows an exemplary receipt having plural blocks of advertising information printed below the transaction information with the advertising information reduced in scale for printing.

FIG. 10 shows an exemplary receipt 40a having advertising information 42a printed below the transaction data. FIG. 11 shows another receipt 40b likewise having the advertising information printed below the transaction information. In this case, however, plural advertising information blocks 42b to 42d are printed reduced. It is thus also possible to enable plural selections with each selection printed reduced in size, in which case a print data generator 5, for example, composes the print data with the advertising information reduced a specific percentage.

Figure 12:
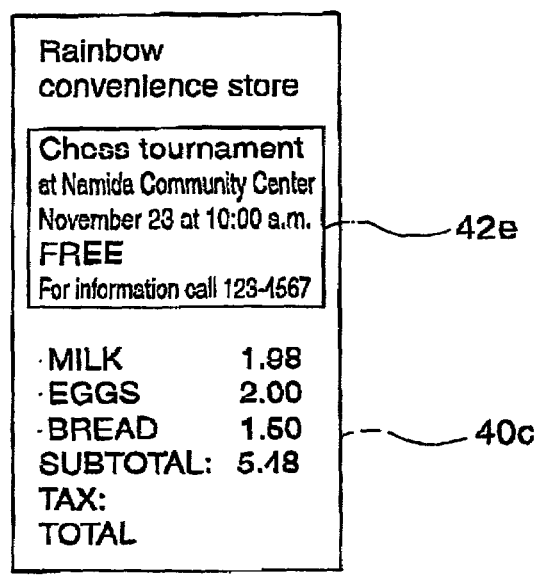
FIG. 12 shows another example in which the advertising information is printed above the transaction information.
Figure 13:
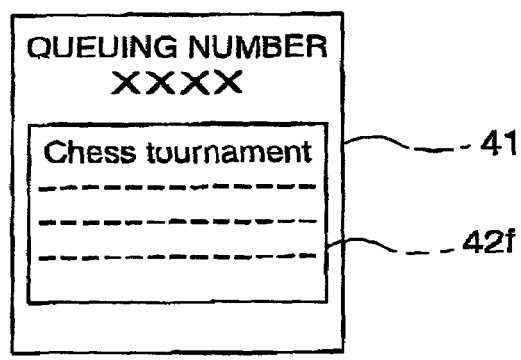
FIG. 13 shows an exemplary queuing number ticket having advertising information printed below the queuing number.

FIG. 12 shows an example in which the advertising information 42e is printed at the top of the receipt 40c, and FIG. 13 shows an example in which the advertising information 42f is printed below the number on queuing number ticket 41.

As will be known from the preceding description, it is possible with the present invention to provide a receipt printing and issuing system, advertising method, and data storage medium whereby advertising information of particular interest to the customer receiving the printed matter can be provided. It is therefore possible to print advertising information (additional information) of real interest to the customer on the receipt or other printed matter that is handed to the customer. Because the customer receiving this can be expected to read the information with interest, it is possible to print effective advertising. Being able to provide advertising information matching the interests of individual customers is extremely effective because media of this type is reliably hand delivered individually to the customer.

The present invention shall not be limited to a POS system, for example, and can be applied to any system that issues a printed medium for a specific purpose, and is thus not limited to receipts. Therefore, such systems that are integrated and deployed as an advertising medium are both a large-scale advertising medium and a system capable of providing advertising information matching the particular interests of individual people, and are thus systems capable of providing extremely powerful advertisement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A receipt printing and issuing system for a payment transaction, the system having input devices for an operator, a printing device, a display device for the operator, and a storage device, the system comprising:

a memory control device for receiving and storing one or more advertisements or other additional information to be printed on a receipt paper, wherein the additional information is information other than the transaction information;

a display/input device for interacting with a customer;

a control device for generating a list of items of the additional information to be displayed on the display/input device according to a predetermined condition;

a selection control device for receiving one or more items selected through the display/input device, wherein in the event selection input waiting time elapses, and there is no selection by the customer, the selection control device selects the additional information from a list of items of the additional information; and a print data generating device for generating print data to be printed on the receipt paper by merging original receipt information according to the payment transaction and the additional information designated by the one or more selected item in the list and sending the merged information to the printing device.

2. A receipt printing and issuing system as described in claim 1, wherein the memory control device receives and stores said additional information input over a network.

3. A receipt printing and issuing system as described in claim 1, wherein the selection control device selects at least one item of additional information.

4. A receipt printing and issuing system as described in claim 3, wherein the selection control device automatically reads specific additional information according to a specific rule when a specific time has elapsed.

5. A receipt printing and issuing system as described in claim 4, wherein the display control device selectively changes the specific condition for generating a list of additional information presented on the display device.

6. A receipt printing and issuing system as described in claim 3, wherein the print data generating device generates print data by reducing plural item of additional information read by the selection control device to a specific ratio when plural items of additional information are selected.

7. A receipt printing and issuing system as described in claim 1, wherein the receipt printing and issuing system is a purchase transaction processing system further comprising:

an accounting information control device for registering a product purchase by a customer and outputting accounting information;

said print data generating device generating print data by combining accounting information output by the accounting information control device with the additional information read by the selection control device for printing as a receipt.

8. A receipt printing and issuing system as described in claim 1, wherein the receipt printing and issuing system is a customer ticket issuing system further comprising:

a queuing number control device for managing queuing numbers and outputting said queuing number as print data;

said print data generating device generating and sending to the printing device print data by combining print data output by the queuing number control device with the additional information read by the selection control device.

9. An additional information printing method using a receipt printing and issuing system having an input device, printing device, display device, and storage device for storing advertising or other additional information, and printing said additional information in addition to information for a primary purpose including a payment transaction, said printing method comprising:

(a) displaying a list of printable additional information to a customer including one or more advertisements, wherein the additional information is information other than the transaction information;

(b) receiving input from the customer selecting additional information including the one or more advertisements included in said displayed list, wherein in the event selection input waiting time elapses, and there is no selection by the customer, a selection control device selects the additional information from a list of items of the additional information;

(c) reading the additional information specified by said input;

(d) generating print data to be printed on receipt paper by merging original receipt information according to the payment transaction and the read additional information designated by the one or more selected items in the list; and (e) sending the generated print data to the printing device.

10. An additional information printing method as described in claim 9, further comprising:

(f) extracting additional information satisfying a particular condition from the stored additional information, and generating the additional information list displayed in step (a).

11. An additional information printing method as described in claim 10, wherein the particular condition in step (f) is selectively changeable.

12. An additional information printing method as described in claim 9, further comprising:

(g) updating the stored additional information with additional information input by way of a network.

13. An additional information printing method as described in claim 12, wherein step (b) includes selecting at least one item of additional information.

14. An additional information printing method as described in claim 9, wherein step (c) includes automatically reading specific additional information according to a specific rule when selection input is not received even after a specific time passes.

15. An additional information printing method as described in claim 14, wherein step (d) includes generating print data by reducing plural selected items of additional information to a specific ratio when plural items of additional information are selected.

16. An additional information printing method as described in claim 9, further comprising:

(h) registering a product purchase by a customer and outputting accounting information;

wherein step (d) includes generating print data by combining said accounting information with the selected additional information, and sending the print data to the printing device for printing as a receipt.

17. An additional information printing method as described in claim 9, further comprising:

(i) managing queuing number output and outputting a queuing number as print data;

wherein step (d) includes generating and sending to the printing device print data by combining said queuing number with the selected additional information.

18. A computer-readable data storage medium having computer program code embodied therein for implementing an additional information printing method as described in claim 9.

19. The receipt printing and issuing system according to claim 1, wherein said control device for generating the list of items of information generates the list of the information satisfying a particular condition related to a customer demographic.

20. The additional information printing method according to claim 9, wherein displaying a list of printable additional information to a customer includes displaying a list of items of information to a customer that satisfies a particular condition related to a customer demographic.

* * * * *